US008065515B2

(12) United States Patent
Droms et al.

(10) Patent No.: US 8,065,515 B2
(45) Date of Patent: *Nov. 22, 2011

(54) AUTOCONFIGURED PREFIX DELEGATION BASED ON DISTRIBUTED HASH

(75) Inventors: Ralph Edward Droms, Westford, MA (US); Pascal Thubert, La Colle sur Loup (FR)

(73) Assignee: Cisco Technology, Inc., San Jose, CA (US)

( * ) Notice: Subject to any disclaimer, the term of this patent is extended or adjusted under 35 U.S.C. 154(b) by 1019 days.

This patent is subject to a terminal disclaimer.

(21) Appl. No.: 11/841,136

(22) Filed: Aug. 20, 2007

(65) Prior Publication Data

US 2008/0263353 A1    Oct. 23, 2008

Related U.S. Application Data

(63) Continuation-in-part of application No. 11/790,043, filed on Apr. 23, 2007.

(51) Int. Cl.
*H04L 29/06* (2006.01)
*H04L 12/56* (2006.01)
*G06F 15/16* (2006.01)

(52) U.S. Cl. .................. 713/153; 709/245; 370/392

(58) Field of Classification Search .................. 370/392, 370/401; 709/238; 713/153
See application file for complete search history.

(56) References Cited

U.S. PATENT DOCUMENTS

| | | | | |
|---|---|---|---|---|
| 6,804,720 | B1 * | 10/2004 | Vilander et al. | 709/229 |
| 6,925,087 | B2 * | 8/2005 | Inoue | 370/401 |
| 6,959,009 | B2 * | 10/2005 | Asokan et al. | 370/475 |
| 7,039,035 | B2 | 5/2006 | Droms et al. | |
| 7,263,075 | B2 * | 8/2007 | Roh et al. | 370/310 |
| 7,362,756 | B2 * | 4/2008 | Choi et al. | 370/389 |
| 7,706,374 | B2 * | 4/2010 | Huang | 370/392 |
| 2001/0024443 | A1 * | 9/2001 | Alriksson et al. | 370/401 |
| 2002/0126642 | A1 | 9/2002 | Shitama | |
| 2003/0012179 | A1 | 1/2003 | Yano et al. | |
| 2003/0095504 | A1 | 5/2003 | Ogier | |
| 2003/0099246 | A1 * | 5/2003 | Cox et al. | 370/400 |
| 2004/0028061 | A1 | 2/2004 | Sawada et al. | |

(Continued)

OTHER PUBLICATIONS

Guillaume Chelius, Eric Fleury and Laurent Toutain, No Administration Protocol (NAP) for IPv6 Router Auto-Configuration, Mar. 2005, aina, vol. 2, pp. 801-806, 19th International Conference on Advanced Information Networking and Applications (AINA'05) vol. 2 (INA,, USW,, WAMIS,, and IPv6 papers).*

(Continued)

*Primary Examiner* — Kevin Bates
*Assistant Examiner* — Robert B McAdams
(74) *Attorney, Agent, or Firm* — Leon R. Turkevich (57) ABSTRACT

In one embodiment, a method comprises detecting, by a router, an unsolicited first router advertisement message from an attachment router that provides an attachment link used by the router, the first router advertisement message specifying a first IPv6 address prefix owned by the attachment router and usable for address autoconfiguration on the attachment link; detecting, by the router, an unsolicited delegated IPv6 address prefix from the attachment router and that is available for use by the router; and automatically selecting by the router a second IPv6 address prefix based on concatenating a suffix to the delegated IPv6 address prefix, including dynamically generating the suffix based on a prescribed distributed hash operation executed by the router, the second IPv6 address prefix for use on at least one ingress link of the router.

21 Claims, 7 Drawing Sheets

U.S. PATENT DOCUMENTS

| | | | |
|---|---|---|---|
| 2004/0083306 A1* | 4/2004 | Gloe | 709/245 |
| 2004/0111529 A1 | 6/2004 | Parmar | |
| 2004/0205235 A1* | 10/2004 | Matsuhira | 709/238 |
| 2005/0041671 A1 | 2/2005 | Ikeda et al. | |
| 2006/0056369 A1* | 3/2006 | Morishige et al. | 370/338 |
| 2006/0080728 A1 | 4/2006 | Wen et al. | |
| 2006/0161661 A1 | 7/2006 | Johnson et al. | |

OTHER PUBLICATIONS

Cain et al., "Internet Group Management Protocol, Version 3", Network Working Group, Request for Comments: 3376, Oct. 2002, pp. 1-53.

Lutchansky, "IPv6 Router Advertisement Prefix Delegation Option", IETF Internet Draft, <draft-lutchann-ipv6-delegate-option-00.txt>, Feb. 2002.

Cates, "Robust and Efficient Data Management for a Distributed Hash Table" [online], Dept. of Electrical Engineering and Computer Science, Massachusetts Institute of Technology, Jun. 2003 [retrieved on Jul. 16, 2007]. Retrieved from the Internet: <URL: http://pdos.csail.mit.edu/papers/chord:cates-meng.pdf>, pp. 1-64.

Stoica et al., "Chord: A Scalable Peer-to-peer Lookup Service for Internet Applications" [online], SIGCOMM '01, Aug. 27-31, 2001, San Diego, California; MIT Laboratory for Computer Science [retrieved on Jul. 16, 2007]. Retrieved from the Internet: <URL: http://pdos.csail.mit.edu/papers/chord:sigcomm01/chord_sigcomm.pdf>, pp. 1-12.

Burkard, "Herodotus: A Peer-to-Peer Web Archival System" [online], Dept. of Electrical Engineering and Computer Science, Massachusetts Institute of Technology, May 2002 [retrieved on Jul. 16, 2007]. Retrieved from the Internet: <URL:http://pdos.csail.mit.edu/papers/chord:tburkard-meng.pdf> pp. 1-64.

"Distributed hash table", Jun. 29, 2007 [online], [retrieved on Jul. 13, 2007]. Retrieved from the Internet: <URL: http://en.wikipedia.org/w/index.php?title=Distributed_hash_table&print=&printable=yes>, pp. 1-4.

Rao et al., "IPv6 Prefix Delegation using ICMPv6" <draft-rao-ipv6-prefix-delegation-00.txt>, Network Working Group, Internet Draft, Aug. 21, 2006, pp. 1-15.

IP Version 6 Working Group Discussion Archive—Thread Index and Messages, Re: simpler prefix delegation [online], Mar. 18-22, 2004 [retrieved on Jun. 28, 2007]. Thread Index Retrieved from the Internet: <URL: http://www1.ietf.org/mail-archive/web/ipv6/current/thrd225.html>, pp. 1-70.

IP Version 6 Working Group Discussion Archive—Thread Index and Messages, Re: Prefix Delegation using ICMPv6 [online], Aug. 23-25, 2006 [retrieved on Jun. 28, 2007]. Thread Index Retrieved from the Internet: <URL: http://www1.ietf.org/mail-archive/web/ipv6/current/thrd45.html>, pp. 1-166.

Deering et al., Internet Protocol, Version 6 (IPv6) Specification, Network Working Group, Request for Comments: 2460, Dec. 1998, pp. 1-39.

Narten et al., "Neighbor Discovery for IP Version 6 (IPv6)", Network Working Group, Request for Comments: 2461, Dec. 1998, pp. 1-93.

Thomson et al., "IPv6 Stateless Address Autoconfiguration", Network Working Group, Request for Comments: 2462, pp. 1-25.

Droms et al., "Dynamic Host Configuration Protocol for IPv6 (DHCPv6)", Network Working Group, Request for Comments: 3315, Jul. 2003, pp. 1-101.

Hinden et al., "Internet Protocol Version 6 (IPv6) Addressing Architecture", Network Working Group, Request for Comments: 3513, Apr. 2003, pp. 1-26.

Troan et al., "IPv6 Prefix Options for Dynamic Host Configuration Protocol (DHCP) version 6", Network Working Group, Request for Comments: 3633, Dec. 2003, pp. 1-19.

Nikander et al., "IPv6 Neighbor Discovery (ND) Trust Models and Threats", Network Working Group, Request for Comments: 3756, May 2004, pp. 1-23.

Miyakawa et al., "Requirements for IPv6 Prefix Delegation", Network Working Group, Request for Comments: 3769, Jun. 2004, pp. 1-6.

Arkko et al., "SEcure Neighbor Discovery (SEND)", Network Working Group, Request for Comments: 3971, Mar. 2005, pp. 1-56.

Aura, "Cryptographically Generated Addresses (CGA)", Network Working Group, Request for Comments: 3972, Mar. 2005, pp. 1-22.

Mitton et al., "Distributed Node Location in clustered multi-hop wireless networks.", [online], Institut National De Recherche En Informatique Et En Automatique, Rapport de recherche, No. 5723, 2004 [retrieved on Jul. 13, 2007]. Retrieved from the Internet: <URL: http://hal.inria.fr/docs/00/07/02/95/PDF/RR-5723.pdf>, pp. 1-33.

Levy-Abegnoli et al., U.S. Appl. No. 11/808,059, filed Jun. 6, 2007.
Thubert et al., U.S. Appl. No. 11/808,362, filed Jun. 8, 2007.
Popoviciu et al., U.S. Appl. No. 11/346,148, filed Feb. 1, 2006.
Levy-Abegnoli et al., U.S. Appl. No. 11/636,433, filed Dec. 11, 2006.
Levy-Abegnoli et al., U.S. Appl. No. 11/826,594, filed Jul. 17, 2007.

* cited by examiner

AUTOCONFIGURED PREFIX DELEGATION BASED ON DISTRIBUTED HASH

This application is a continuation-in-part of commonly-assigned, copending application Ser. No. 11/790,043, filed Apr. 23, 2007.

TECHNICAL FIELD

The present disclosure generally relates to routers delegating Internet Protocol (IP) network address prefixes to other routers.

BACKGROUND

The Internet Engineering Task Force (IETF) Request for Comments (RFC) 2461, describes a neighbor discovery protocol for IPv6 nodes that are connected on the same wired or wireless link. The RFC 2461 also specifies a router advertisement message format that enables a router to specify an address prefix to be used by a host attached to the link for autonomous (stateless) address configuration; alternately, the router advertisement message can direct hosts connected to the link to utilize stateful address configuration according to Dynamic Host Configuration Protocol (DHCPv6), described for example in RFC 3315.

RFC 3633 describes IPv6 prefix delegation, where a delegating router that includes a DHCP server can delegate an address prefix to a requesting router, for example across an administrative boundary.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

OVERVIEW

In one embodiment, a method comprises detecting, by a router, an unsolicited first router advertisement message from an attachment router that provides an attachment link used by the router, the first router advertisement message specifying a first IPv6 address prefix owned by the attachment router and usable for address autoconfiguration on the attachment link; detecting, by the router, an unsolicited delegated IPv6 address prefix from the attachment router and that is available for use by the router; and automatically selecting by the router a second IPv6 address prefix based on concatenating a suffix to the delegated IPv6 address prefix, including dynamically generating the suffix based on a prescribed distributed hash operation executed by the router, the second IPv6 address prefix for use on at least one ingress link of the router.

In another embodiment, an apparatus comprises a network interface circuit and a routing circuit. The network interface circuit is configured for connecting to an attachment link and receiving an unsolicited first router advertisement message from an attachment router that provides the attachment link. The first router advertisement message specifies a first IPv6 address prefix owned by the attachment router and usable for address autoconfiguration on the attachment link. The network interface circuit further is configured for providing at least one ingress link for attached network nodes. The routing circuit is configured for detecting an unsolicited delegated IPv6 address prefix received by the network interface circuit from the attachment router and that is available for use by the routing circuit. The routing circuit further is configured for automatically selecting a second IPv6 address prefix for use on the at least one ingress link based on concatenating a suffix to the delegated IPv6 address prefix, and dynamically generating the suffix based on a prescribed distributed hash operation.

DETAILED DESCRIPTION

Particular embodiments extend the capabilities of routers in an Internet Protocol (IP) network, for example an IPv6 network implemented according to RFC 2460, RFC 2461, and RFC 3513. Such routers have been able to generate and output, onto a network link an unsolicited router advertisement message that specifies a prefix information option (PIO) of an IPv6 address prefix that can be used for address autoconfiguration on the network link as described in RFC 2461. However, such routers to date have relied on Dynamic Host Configuration Protocol (DHCP) with Prefix Delegation (DHCP-PD), described for example in RFC 3315, RFC 3633, and U.S. Pat. No. 7,039,035.

The particular embodiments extend the capabilities described in commonly-assigned, copending application Ser. No. 11/790,043, filed Apr. 23, 2007, entitled "Extensions to IPv6 Neighbor Discovery Protocol for Automated Prefix Delegation". In summary, copending application Ser. No. 11/790,043 describes routers that can generate and output an unsolicited router advertisement that specifies a prefix delegation information option (PDIO) that specifies address prefixes that can be used by attached routers for routing operations other than address autoconfiguration on the attached link. The prefix delegation information option (PDIO) can either be attached concurrently with the existing prefix information option (PIO) as described in RFC 2461, or can be output within its own router advertisement message that does not specify any prefix information option for address autoconfiguration. Consequently, a router can autonomously assign an address prefix onto a link by outputting a router advertisement message specifying the prefix delegation information option identifying at least one delegated address prefix that is available for use by other routers attached to the link.

Hence, copending application Ser. No. 11/790,043 describes routers that can detect the prefix delegation information option in a received router advertisement message and that can automatically claim a prefix from the delegated address prefix specified in the unsolicited router advertisement message.

The particular embodiments disclosed herein extend upon the copending application Ser. No. 11/790,043 by enabling a router to automatically select a prefix from the delegated address prefix specified in the unsolicited router advertisement message from the attachment router. The router can automatically select a prefix based on dynamically generating a suffix using a prescribed distributed hash operation executed by the router. The dynamically generated suffix can be concatenated (i.e., appended) to the delegated IPv6 address prefix, resulting in an autoconfigured delegated IPv6 address prefix for use by the router on its ingress links. If permitted by the attachment router having sent the unsolicited router advertisement message, each router can further subdelegate its autoconfigured delegated IPv6 address prefix among its ingress links. Hence, the capability of routers to generate respective autoconfigured delegated IPv6 address prefixes enables the automated deployment of routers in a local IPv6 network, without the necessity of implementing a routing protocol between the routers in the local IPv6 network.

As described in further detail below, in one embodiment each router can dynamically generate the suffix for its autoconfigured delegated IPv6 address prefix based on generating a cryptographically-generated address (CGA) as described in RFC 3972, and obtaining the suffix based on retrieving a prescribed number of ending bits from the cryptographically-generated address. Each router also can validate its corresponding cryptographically-generated address by performing Duplicate Address Detection according to RFC 2461 and RFC 2462, in combination with using Secure Neighbor Discovery as described in RFC 3971. Each router also can concurrently validate the cryptographically-generated address and the autoconfigured delegated IPv6 address prefix based on outputting a neighbor solicitation message that not only targets the cryptographically-generated address and includes a CGA option for secure validation of the CGA address, but that further specifies a prefix claim option that specifies the autoconfigured delegated IPv6 address prefix. Hence, routers on the attachment link can learn their respective autoconfigured delegated IPv6 address prefixes based on exchanging neighbor solicitation messages (and solicited neighbor advertisement messages) using a secure neighbor discovery protocol, without the necessity of executing a routing protocol between the routers.

As described in further detail below, in another embodiment each router can dynamically generate the suffix for its autoconfigured delegated IPv6 address prefix based on receiving an assigned hash index value from the attachment router according to a prescribed partitioning of a distributed hash table (DHT). The assigned hash index value is used by the router to generate the suffix based on hashing the first IPv6 address prefix, received from the attachment router for address autoconfiguration, with the assigned hash index value according to the prescribed distributed hash operation. The suffix can then be concatenated with the second IPv6 address prefix supplied for prefix delegation. Hence, any router having received the respective assigned hash index values of the other routers attached to the attachment link can dynamically generate a next-hop address for routing an IPv6 datagram (i.e., an IPv6 data packet) specifying an identifier, based on concatenating the first IPv6 address prefix with a dynamically-generated routing suffix.

Figure 1:
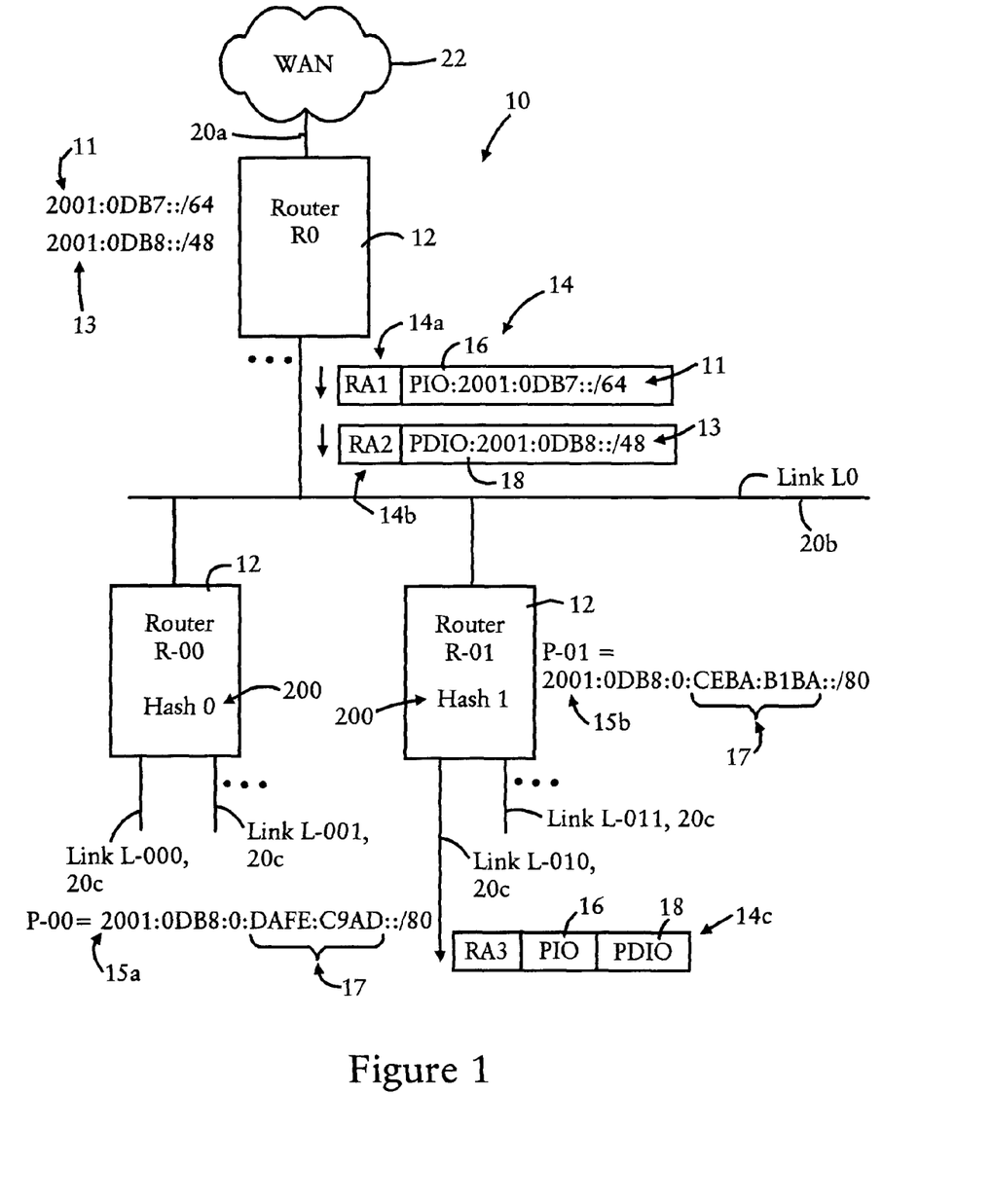
FIG. 1 illustrates an example network having routers that can execute automated prefix delegation based on a prescribed distributed hash operation, according to an example embodiment.

FIG. 1 is a diagram illustrating an example network 10 having routers 12 configured for autoconfigured prefix delegation based on dynamically generating a suffix using a prescribed distributed hash operation, according to an example embodiment. Each router 12 can be configured for outputting router advertisement (RA) messages 14 onto its ingress link that serves as an attachment link (i.e., egress link) for attached routers. The term "ingress link" refers to a link that is provided by "an attachment router" for attachment by "attached routers", and the term "egress link" refers to a link that is used by "an attached router" to attach to "an attachment router". As illustrated in FIG. 1, the router "R0" 12 serves as a clusterhead for the network 10, and relies on an egress link 20*a* as its attachment link to the wide area network 22. The router "R0" also can be implemented as a router having a cable modem as its ingress link interface for a broadband cable service provider, where the link 20*a* connects the router "R0" to the distribution network of the broadband cable service provider, and the link 20*b* provides attachment links to customer routers (e.g., R-00, R-01, etc.) at respective subscriber premises.

The router "R0" provides an ingress link "L0" 20*b* that serves as an attachment link for the routers "R-00" and "R-01" 12 that have attached to the router "R0" 12 as their attachment router, for example via respective cable modems. The router "R-00" which relies on its egress link 20*b* as its attachment link, provides ingress links "L-000" and "L-001" 20*c* as attachment links for other attached routers or host devices (not shown); the router "R-01" 12 which relies on its egress link 20*b* as its attachment link, provides its ingress links "L-010" and "L-011" 20*c* as attachment links for other attached routers or host devices (not shown). In the absence of a routing protocol, more complex topologies can be "broken down" (e.g., characterized as) a logical tree topology, even if the complex topology includes overlapping branches.

Hence, each router in a tree topology will have only one egress link that serves as "an attachment link" for the router, and one or more ingress links that can provide respective attachment links for attached routers.

Each router 12 can be configured for outputting unsolicited router advertisement messages 14 onto its ingress links. For example, the router "R0" 12 can be configured for outputting an unsolicited router advertisement message 14*a* onto its ingress link "L0" 20*b* that includes a prefix information option (PIO) 16, as specified by Section 4.2 of RFC 2461, that identifies a first IPv6 address prefix (e.g., "2001:0DB7::/64") 11 owned by the attachment router "R0" 12 and usable for address autoconfiguration on the attachment link 20*b*. Note that IP addresses and IP address prefix values are illustrated herein according the conventions specified in RFC 3513. In addition, the reference "0x" preceding an expression can be used to indicate the expression is hexadecimal notation, for example "0xABCD" indicates the expression "ABCD" is a 16-bit hexadecimal value.

The router "R0" also can be configured for outputting onto its ingress link "L0" 20*b* an unsolicited router advertisement message 14*b* that specifies a prefix delegation information option (PDIO) 18 that specifies a second IPv6 address prefix, also referred to herein as an unsolicited delegated IPv6 address prefix (e.g., "2001:0DB8::/48") 13, described in further detail below with respect to FIG. 3. Hence, each router 12 (e.g., router "R0") can be configured for outputting onto its ingress link (e.g., "L0" 20*b*) an unsolicited router advertisement message (e.g., 14*a*) that specifies a prefix information option 16 to be used for address autoconfiguration, plus a second unsolicited router advertisement message (e.g., 14*b*) that specifies a prefix delegation information option 18 that identifies an unsolicited delegated IPv6 address prefix for use by attached routers (e.g., routers "R-00" and "R-01") 12 in autoconfiguring an IPv6 address prefix 15 (e.g., 15*a* or 15*b*). If specified in the prefix delegation information option 18, each router (e.g., "R-01") 12 also can be configured for outputting onto its ingress interface a router advertisement message (e.g., 14*c*) that includes both the prefix information option (PIO) 16 for address autoconfiguration on the corresponding ingress link (e.g., "L-010" 20*c*), and the prefix delegation information option (PDIO) 18 specifying a delegated IPv6 address prefix for use by routers (not shown) on the corresponding ingress link (e.g., "L-010" 20*c*), enabling further subdelegation of the corresponding autoconfigured IPv6 address prefix (e.g., 15*b*).

Each router 12 (e.g., router "R-01" 12), in response to receiving the unsolicited router advertisement message (e.g. 14*b*) specifying the specifying the prefix delegation information option (PDIO) 18, can respond to the unsolicited router advertisement message (e.g., 14*b*) by automatically selecting an autoconfigured IPv6 address prefix 15 (e.g., 15*a* or 15*b* of FIG. 1) based on concatenating the unsolicited delegated IPv6 address prefix 13 specified in the PDIO 18 with a dynamically generated suffix 17 based on a prescribed hash operation 200. As described below, each attached router (e.g., "R-00") 12 can dynamically generate a suffix (e.g., a 32-bit hexadecimal suffix "0xDAFE:C9AD") 17 based on executing a prescribed hashing operation (e.g., "Hash 0") 200, and appending the corresponding suffix 17 to the unsolicited delegated IP address prefix 13. In one embodiment, the hashing operation 200 can be implemented based on dynamically generating a cryptographically-generated address (CGA) based on hashing the IPv6 address prefix 11 using a prescribed SHA-1 hashing according to RFC 3972, and retrieving a prescribed number of ending bits from the CGA address to form the corresponding suffix 17. In another embodiment, the hashing operation 200 can be implemented based on each attached router 12 receiving an assigned hash index value according to a prescribed partitioning of a distributed hash table (DHT), where the corresponding suffix 17 is generated based on the corresponding router (e.g., "R-00") hashing the received IPv6 address prefix 11 using the corresponding assigned hash index value.

Hence, routers can automatically obtain delegated address prefixes from received router advertisement messages specifying prefix delegation information options 18. As described below, routers also can output neighbor solicitation messages in order to query whether a given IPv6 address prefix is in use by another router, for example in order to obtain reachability information, or to determine whether the IPv6 address prefix can be used without any conflict with another router. Hence, routers can automatically obtain IPv6 address prefixes, and obtain reachability information for reaching other routers on the same attachment link 20*b*, without the necessity of executing any routing protocols between the routers 12.

Figure 2:
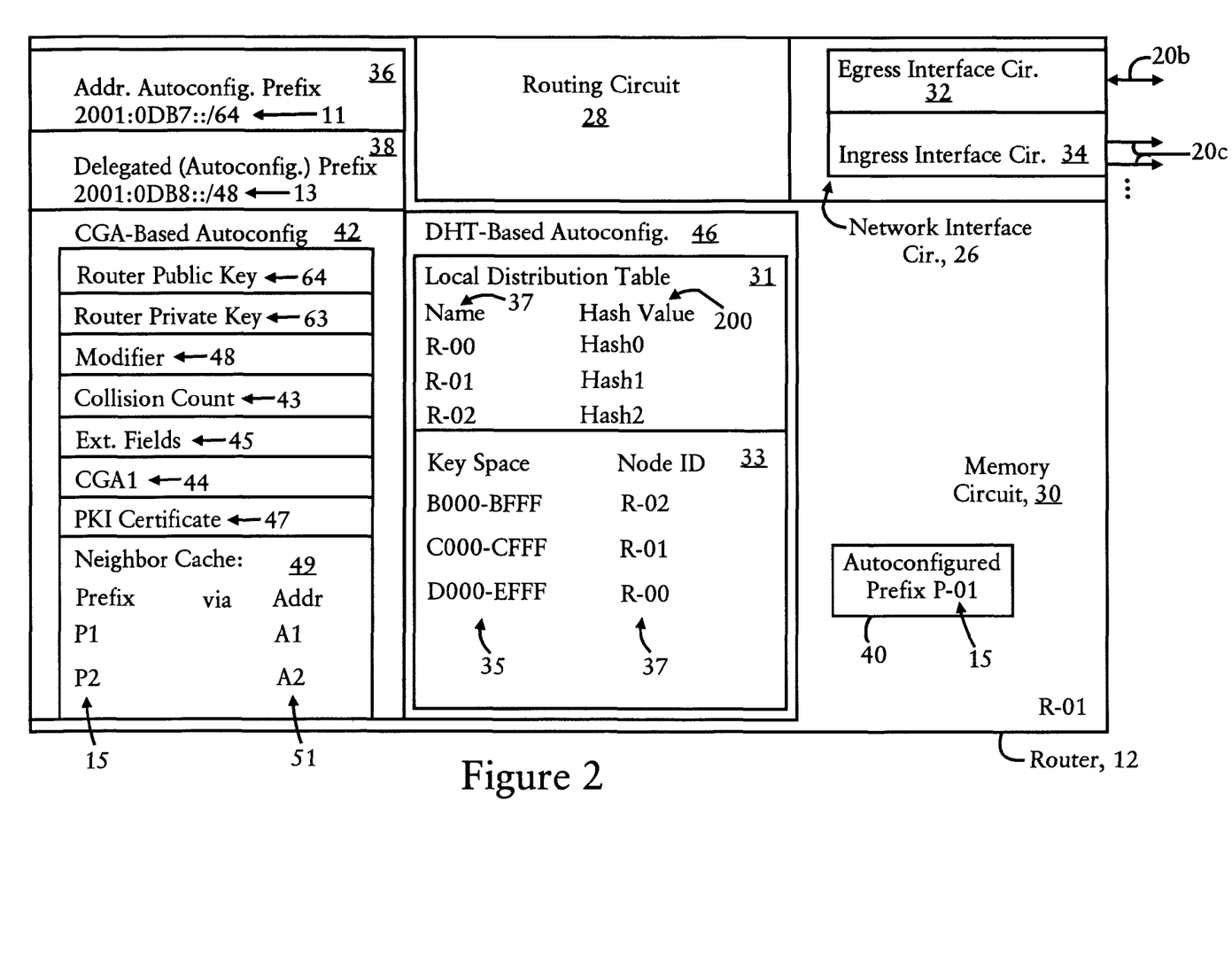
FIG. 2 illustrates an example router from the network of FIG. 1.

FIG. 2 is a diagram illustrating an example router 12 (e.g., "R-01") according to an example embodiment. The router 12 includes a network interface circuit 26, a routing circuit 28, and a memory circuit 30.

The network interface circuit 26 includes an egress interface circuit 32 configured for detecting and connecting to an attachment link (e.g., "L0" 20*b*) provided by an attachment router (i.e., a "parent" router) (e.g., "R0"), for example in response to detecting an unsolicited router advertisement message (e.g., 14*a*) specifying a prefix information option field 16 that identifies an IPv6 address prefix 11 to be used for autoconfiguration. As described below, the egress interface circuit 32 also can detect a prefix delegation information option 18 from a received router advertisement message (e.g., 14*b*).

Figure 4:
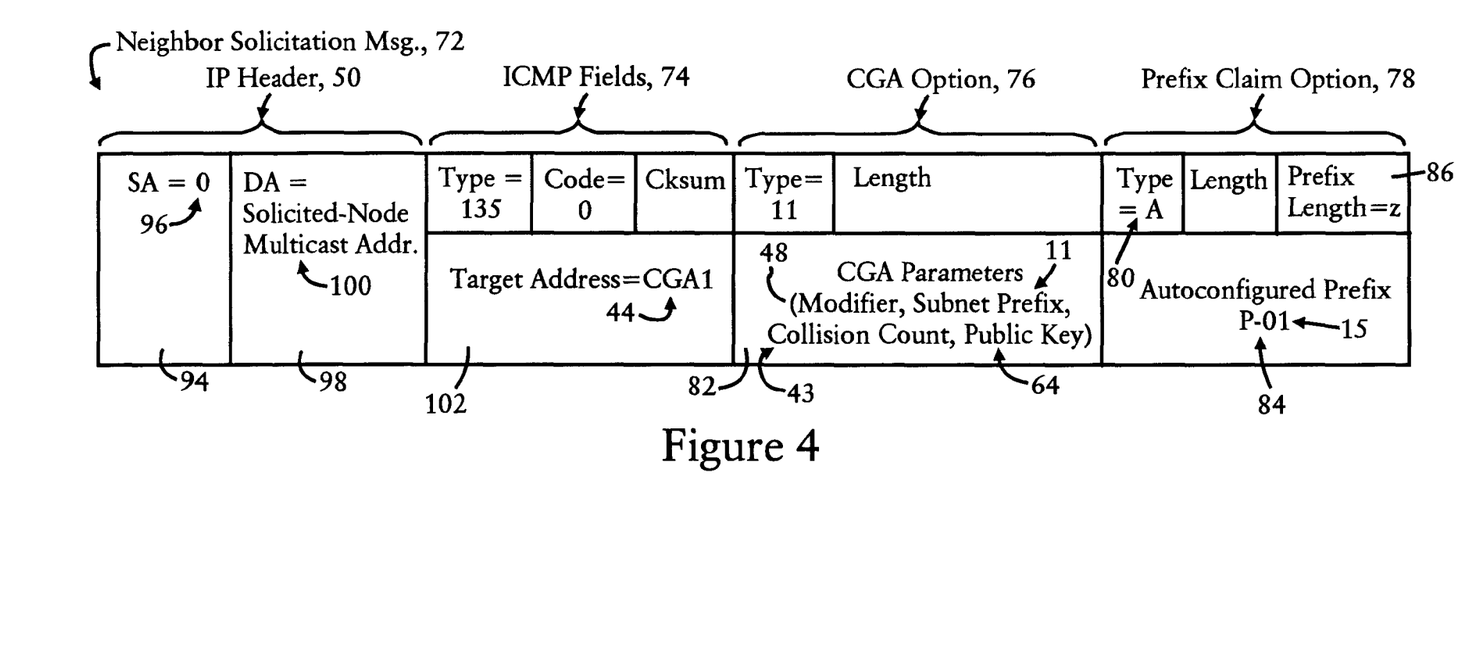
FIG. 4 illustrates an example neighbor solicitation message generated by one of the routers of FIG. 1 and having an example prefix claim option specifying a claimed address prefix, according to an example embodiment.

The egress interface circuit 32 also can be configured to output onto the egress link, i.e., attachment link (e.g., 20*b*), a neighbor solicitation message 72, illustrated for example in FIG. 4. The egress interface 32 also can be configured to output onto the egress link (e.g., 20*b*) a solicited or unsolicited neighbor advertisement (NA) message 112, illustrated for example in FIG. 6. The egress interface circuit 32 also can be configured for monitoring different multicast addresses based on instructions received from the routing circuit 28, described below. Hence, the egress interface circuit 32 can send and receive neighbor solicitation messages 72 and neighbor advertisement messages 112, enabling communication of addresses and claimed network prefixes among peer routers (e.g., R-00, R-01) attached to the attachment link 20*b*.

The egress interface circuit 32 also can be configured for participating in distributed hash table (DHT) operations, including receiving an assigned hash index value 200 from the attachment router, as well as other hash values assigned to other routers. Hence, the egress interface circuit 32 can be configured for sending and receiving information according to various DHT protocols, for example CHORD.

The network interface circuit 26 also includes an ingress interface circuit 34 that can be configured for providing ingress links 20*c* that are used as attachment links by attached routers. The ingress interface circuit 34 also can be configured for outputting router advertisement messages for respective ingress links 20*c*. Both the egress interface circuit 32 and the ingress interface circuit 34 can be configured for outputting neighbor advertisement messages 22 on the respective egress and ingress links.

The routing circuit 28 can be configured for receiving the messages from the egress interface circuit 32 and the ingress interface circuit 34, storing and reading data from the memory circuit 30, and generating the router advertisement messages 14, the neighbor solicitation messages 72, and/or the neighbor advertisement messages 112 for output either by the egress interface circuit 32 or the ingress interface circuit 34, as appropriate. As described below, the routing circuit 28 can automatically select (i.e., autoconfigure) and defend an address prefix 15 based on the delegated prefix 13 having been retrieved from a received router advertisement message 14. The routing circuit 28 also can use the autoconfigured address prefix 15 for use on ingress links, including outputting router advertisement messages for address autoconfiguration on ingress links, or subdelegation of address prefixes on the ingress links based on determining that recursive delegation is authorized from the attachment router (i.e., the parent router). The routing circuit 28 also can be configured for performing other routing operations, for example forwarding packets, responding to Internet Control Management Protocol (ICMP) packets, etc.

The memory circuit 30 can be configured to include circuitry (e.g., data tables, registers, etc.) for storing various parameters for use by the routing circuit 28. For example, the memory circuit 30 can include an address autoconfiguration prefix register 36 configured for storing the IPv6 address prefix 11 to be used for address autoconfiguration on the attachment link (e.g., "L0") 20b. The memory circuit 30 also can include a delegated prefix register 38 configured for storing the IPv6 address prefix 13 to be used for autoconfigured prefix delegation. The memory circuit 30 also can include a router prefix register circuit 40 configured for storing the autoconfigured IPv6 address prefix 15 generated by the routing circuit 28.

Depending on implementation, the memory circuit 30 also can be configured for including circuitry (e.g., data tables, registers, etc.) for storing various parameters for use by the routing circuit 28. For example, according to one example embodiment, the memory circuit 30 can include a first memory circuit 42 configured for storing parameters associated with automatically selecting the IPv6 address prefix 15 based on dynamically generating the corresponding suffix 17 from generation of a cryptographically-generated address 44 as described in RFC 3972 (also referred to herein as CGA-based autoconfiguration). According to another example embodiment, the memory circuit 30 can include a second memory circuit 46 configured for storing parameters associated with dynamically generating the corresponding suffix 17 for the autoconfigured IPv6 address prefix 15 based on applying a prescribed hash key 200 assigned to the router 12 from a prescribed partitioning of a distributed hash table (DHT) (also referred to herein as DHT-based autoconfiguration). Still another example embodiment can configure the memory circuit 30 to include both memory circuits 42 and 46 within the memory circuit 30, as desired, based on an administrator configuring the routing circuit 28 to execute either CGA-based autoconfiguration of the autoconfigured prefix 15, or DHT-based autoconfiguration of the autoconfigured prefix 15, depending on the deployment scenario chosen by the administrator. Also note that the memory circuits 42 and 46 can be implemented dynamically by the routing circuit 28, for example based on memory address assignment and partitioning executed by the routing circuit 28.

Assuming the routing circuit 28 is configured for executing the CGA-based autoconfiguration of the autoconfigured IPv6 address prefix 15, the memory circuit 42 can be configured for storing an RSA public key 64 of the router, the RSA private key 63 that corresponds to the public key 64, and additional CGA parameters used for generating the CGA address value (e.g., "CGA1") 44 according to RFC 3972, including a pseudorandom modifier value 48, a collision count value 43, and optional extension fields 45 specified within the CGA parameters data structure generated by the routing circuit 28. The memory circuit 42 also can be configured for storing a public key certificate (e.g., a PKI certificate) 47 that has been issued by a trusted certifying authority.

The memory circuit 42 also can be configured for storing a neighbor cache 49 that identifies reachable neighbors on the attachment link (e.g., 20b) based on their respective autoconfigured IPv6 addresses (illustrated as A1, A2, etc.) 51. The neighbor cache 49 also can identify autoconfigured prefixes 15 of the respective reachable neighbors and that are within the prescribed aggregation prefix 13 advertised by the attachment router "R0".

Although not illustrated in FIG. 2, the memory circuit 32 also can include a claimed/ownership status field that identifies whether any currently-selected address prefix 15 stored in the router prefix register circuit 40 is "claimed", or "owned".

An address prefix is "claimed" during duplicate address detection, where a decision is pending by the routing circuit 28 whether to establish ownership of the currently-selected address prefix, assuming no other router asserts that the currently-selected address prefix is already owned. As described below, if a conflicting neighbor advertisement message 112 is received within a prescribed time interval following outputting a neighbor solicitation message 72 (see FIG. 4) and that identifies the currently-selected address prefix 15 is owned by the source of the neighbor advertisement message 112 (e.g., Type="B"), the routing circuit 28 will abandon the currently-selected address prefix 15 and attempt to select another address prefix within the delegated prefix 13. If, however, the routing circuit 28 determines an absence of any neighbor advertisement message 112 after a prescribed time interval following outputting a neighbor solicitation message advertising the CGA address value 44 and the autoconfigured prefix 15, the routing circuit 28 claims ownership of the autoconfigured prefix 15 for defense against subsequent neighbor solicitation messages.

Assuming the routing circuit 28 is configured for executing the DHT-based autoconfiguration of the autoconfigured IPv6 address prefix 15, the memory circuit 46 can be configured for storing a local distribution table 31, and a key space to node mapping table 33. In particular, a distributed hash table is based on partitioning of a key space among different network nodes (e.g., peerrouters "R-00", "R-01", "R-02", etc.). For example, the key space to node mapping table 33 illustrates that key values 35 within the hexadecimal range of "B000-BFFF" are assigned to the router 12 having the node identifier 37 of "R-02"; key values 35 within the hexadecimal range of "C000-CFFF" are illustrated as assigned to the router 12 having the node identifier 37 of "R-01"; key values 35 within the hexadecimal range of "D000-EFFF" are illustrated as assigned to the router 12 having the node identifier 37 of "R-00". As apparent from the key space to node mapping table 33, for any key within the defined key space, the router 12 either owns the key or has a link to a node that is closer to the key. Hence, if any message or datagram has an identifier that identifies a destination within the key space as partitioned by the key space to node mapping table 33, the routing circuit 28 can identify the node that should receive the data packet based on its corresponding node identifier 37 (also referred to as key based routing). As described below, the routing circuit 28 also can dynamically generate a next hop destination address for delivering the data packet to the node that owns the key value referenced in the packet, based on applying the corresponding hash value 200 specified in the local distribution table 31 to the address autoconfiguration prefix 11, and appending the resulting suffix to the autoconfiguration prefix 11 to generate a 128-bit destination IPv6 address for the node that owns the key value referenced in the packet.

Any of the disclosed circuits of the router 12 (including the network interface circuit 26, the routing circuit 28, and their associated components) can be implemented in multiple forms, including hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor such as a microprocessor (not shown), where execution of executable code stored in internal nonvolatile memory (e.g., within the memory circuit 30) causes the processor to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor. The memory circuit 30 can be implemented, for example, using a non-volatile memory such as a programmable read only memory (PROM) or an EPROM, and/or a volatile memory such as a DRAM, etc.

Further, any reference to "outputting a message" or "outputting a packet" can be implemented based on creating the message/packet in the form of a data structure and storing that data structure in a tangible memory medium in the disclosed apparatus (e.g., in a transmit buffer). Any reference to "outputting a message" or "outputting a packet" also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" can be implemented based on the disclosed apparatus detecting the electrical (or optical) transmission of the message/packet on the communications medium, and storing the detected transmission as a data structure in a tangible memory medium in the disclosed apparatus (e.g., in a receive buffer).

Figure 3:
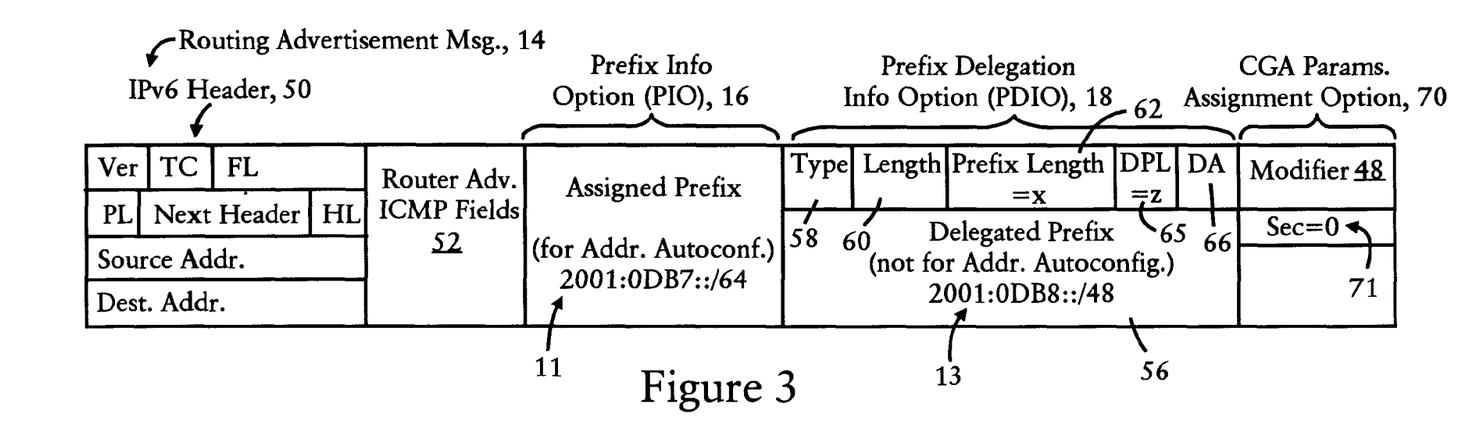
FIG. 3 illustrates an example router advertisement message generated by one of the routers of FIG. 1 and having an example prefix delegation information option specifying a delegated address prefix, according to an example embodiment.

FIG. 3 is a diagram illustrating an example router advertisement message 14 generated by the routing circuit 28 (e.g., from router "R0") according to an example embodiment. The neighbor advertisement message 14 can include an IPv6 header 50 according to RFC 2460, a router advertisement message header 52, a prefix information option 16, a prefix delegation information option 18, and an optional CGA parameters assignment option 70. If preferred, the prefix information option 18 can be omitted, such that the prefix information option 16 and CGA parameters assignment operation 70 can be sent in one router advertisement message, and the prefix delegation option 18 can be sent in another distinct router advertisement message. Although not shown in FIG. 3, the router advertisement message 14 also can includes an RSA signature option according to RFC 3971. The neighbor solicitation message 72 of FIG. 4 and the neighbor advertisement message 112 of FIG. 6 also can include the RSA signature option according to RFC 3971.

The router advertisement message header 52 includes ICMP fields as specified in section 4.2 of RFC 2461. The prefix information option 16 specifies the assigned prefix 11 for autonomous address autoconfiguration, as described in section 4.2 of RFC 2461.

The prefix delegation information option (PDIO) 18 specifies a delegated IPv6 address prefix and can also specify a type field 58, a option length field 60, a prefix length field 62, a required delegated prefix length (DPL) field 65, and a delegation authorization identifier 66. The type field 58 identifies the prefix delegation information option (PDIO) 18 to ensure that the specified delegated prefix 56 is used for IPv6 address prefix delegation, and not autonomous address configuration; in other words, the type field 58 uniquely identifies the option 18 to ensure that the option 18 is not confused with the existing prefix information option 16 that is used for address autoconfiguration. The length field 60 specifies the length of the option 18, and the prefix length field 62 identifies the length (e.g., "x") of the delegated prefix in terms of the number of valid bits; hence, if the 128-bit delegated prefix field 56 specifies a hexadecimal value of "0x2001:0DB8::" (according to the conventions in RFC 3513) and the prefix length field 62 specifies a (decimal) value of "48", then the PDIO 18 specifies the IPv6 address prefix "2001:0DB8::/48" according to the conventions in RFC 3513.

The DPL field 65 specifies a required delegation prefix length (e.g., "z") for any router that attempts to claim a prefix from the delegated prefix 56 during prefix autoconfiguration. For example, if the prefix length field (e.g., x=48) 62 and the delegated prefix field 56 result in the PDIO 18 specifying the delegated address prefix "2001:0DB8::/48" 13, the DPL field 65 can be used to ensure not only that any router does not attempt to claim the entire 48-bit prefix, but also that the autoconfigured delegated prefix 15 is established consistently among the attached routers (e.g., R-00, R-01) to enable consistent route lookups among the routers, described below. Consequently, if the DPL field 65 specifies a (decimal) value of "52" (e.g., z=52), then the required prefix length of the autoconfigured prefix 15 by any attached router is a 52-bit prefix; if the DPL field 65 specifies a (decimal) value of "64", then the required prefix length of the autoconfigured prefix 15 that can be claimed by any attached router is a 64-bit prefix. As described in further detail below, the delegated prefix length field 65 enables a delegating router (e.g., "R0") to require the attached routers to generate a longer suffix 17 during autoconfiguration of the IPv6 address prefix 15. Since the suffix 17 can be based on a prescribed number of trailing bits from the CGA address 44 during CGA-based autoconfiguration, a higher level of security can be provided as the size of the dynamically generated suffix 17 increases. In contrast, a smaller suffix 17 generated from the trailing bits of the CGA address 44 provides less security than the longer suffix 17 generated from the trailing bits of the CGA address 44. Hence, renumbering of the node configured IPv6 address prefix 15 should be performed more often to maintain security as the size of the suffix 17 is reduced; in other words, the CGA address 44 (and the resulting configured IPv6 address prefix 15) should be regenerated after a prescribed time interval that is based on the bit length of the suffix 17.

The delegation authorization identifier 66 specifies (e.g., using a one bit flag) whether any attached router is authorized to perform recursive prefix delegation from a claimed portion of the delegated IPv6 address prefix specified in the PDIO 18. If recursive prefix delegation is not authorized, then an attached router can only use its claimed portion of the delegated IPv6 address prefix (i.e., the autoconfigured prefix 15) for address autoconfiguration on its ingress links; however, if recursive prefix delegation is authorized by the DA field 66, the router can perform recursive prefix delegation and assign a subportion of its claimed address prefix 15 to another attached router on one of its ingress links.

The CGA parameters assignment option 70 can include a modifier value 48 explicitly specified by the delegating router (e.g., "R0"), and a security parameter value 71 set to zero. The modifier value 48 can enable the delegating router to explicitly assign a specific modifier value to a specific attached router, as opposed to a router randomly generating its own modifier value as described in RFC 3972. Since the modifier value 48 is fixed by the delegating router, the security parameters 71 is set to zero. Hence, for a given key pair, a router can be configured to generate only one CGA address 44, enabling the delegating router to provide greater control in the security of the network 10 against untrusted sources.

Although not shown in FIG. 3, the PDIO 18 also can include a timer field that identifies a valid delegation interval (e.g., one hour, 1 day, etc.), where a timer field value of zero indicates that all delegations to the specified prefix 56 have been revoked and that prefix delegation is to be restarted. The routing circuit 28 may set the timer field value to zero, for example, in response to adding a MAC address to its ignore list, or some other administrative change.

FIG. 4 illustrates an example neighbor solicitation message 72 generated by the routing circuit 28 and output by the egress interface circuit 32 onto the attachment link (e.g., 20*b*), according to an example embodiment. As described below with respect to FIG. 5, the routing circuit 28 can generate the neighbor solicitation message 72 in order to initiate duplicate address detection in accordance with RFC 2461, RFC 2462, RFC 3971, and RFC 3972.

The neighbor solicitation message 72 includes an IP header 50, ICMP fields 74, a CGA option 76, and optionally a prefix claim option 78. The IP header 50 includes a source address field 94 that specifies an "unspecified address" value 96 of "0" in accordance with RFC 2461 indicating the lack of a address while performing Duplicate Address Detection-based validation during address autoconfiguration. The destination address field 98 specifies a solicited node multicast address 100 of the target CGA address 44, as defined in Section 2.7.1 of RFC 3513. The ICMP fields 74 include a target address field 102 that specifies the CGA address (e.g., "CGA1") 44 generated by the routing circuit 28. The CGA option 76 specifies the CGA parameters data structure 82 as specified in RFC 3972 (Section 3), including the modifier 48 (either assigned to router or randomly generated by the router), the subnet prefix 11 used for address autoconfiguration, the collision count (initially set to zero) 43, and the RSA public key 64 of the router 12 outputting the neighbor solicitation message 72. As described in RFC 3971, the neighbor solicitation message 72 can be transmitted onto the attachment link 20*b*, even though it is not signed using the corresponding private key 63; rather, the neighbor solicitation message 72 simply will be regarded as insecure.

The prefix claim option 78 specifies the autoconfigured address prefix 15 having been dynamically generated by the router (e.g., router "R-01"), for example the address prefix "2001:0DB8:0:CEBA:B1BA::/80" 15*b*, illustrated as "P-01" in FIGS. 1, 2, 4 and 6. The prefix claim option 78 includes a type field 80 having a value (e.g., "A") that identifies the prefix value 15 specified in the prefix field 84 as a claimed prefix pending completion of duplicate address detection. The prefix claim options 78 also includes a length field identifying the length of the option 78, and a prefix length field 86 identifying a length of the prefix, illustrated as having a length of "z" bits (e.g., z=80 bits).

Hence, any network node on the attachment link 20*b* that is configured for listening to the solicited-node multicast address 100 can detect the neighbor solicitation messages 72 and concurrently determine whether any conflict exists with the CGA address 44 specified in the target address field 102, or whether any conflict exists with the autoconfigured prefix value 15 specified in the prefix field 84 of the prefix claim option 78. If any network node determines that the neighbor solicitation message 72 conflicts with its own assigned address value or prefix value, the network node can output a solicited neighbor advertisement message 112, described below with respect to FIG. 6.

Figure 5:
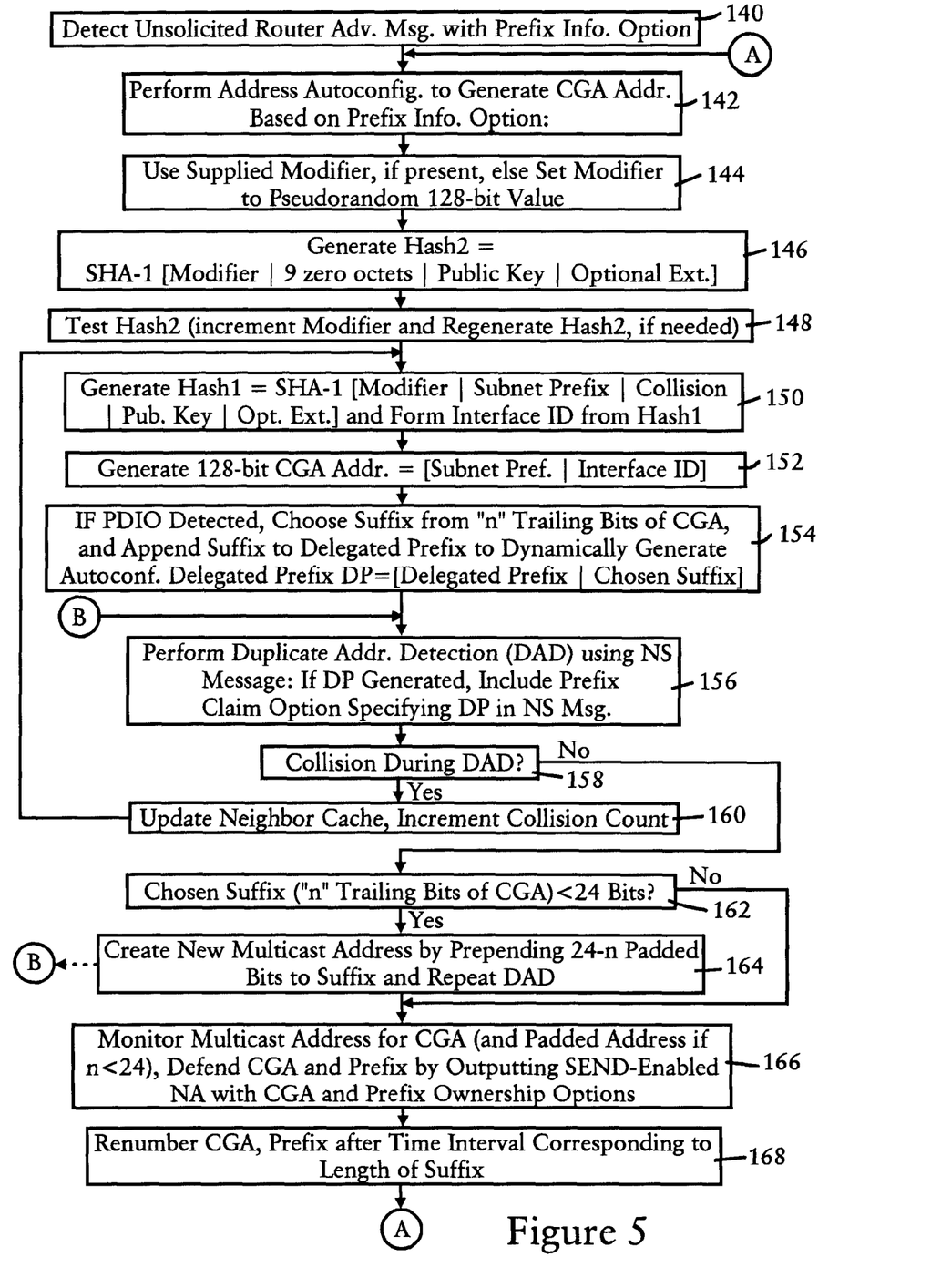
FIG. 5 illustrates an example method by an attached router that autoconfigures a delegated address prefix based on selected trailing bits of a cryptographically-generated address, according to an example embodiment.

FIG. 5 is a diagram illustrating the method of automatic selection of an autoconfigured IPv6 address prefix based on dynamic generation of the suffix using a CGA-based autoconfiguration, according to an example embodiment. The steps described in FIGS. 5, 7, and 8 can be implemented as executable code stored on a computer readable medium (e.g., floppy disk, hard disk, ROM, EEPROM, nonvolatile RAM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

As illustrated in FIG. 5, the routing circuit 28 detects in step 140 an unsolicited router advertisement message 14 having been received by the egress interface circuit 32 of FIG. 2. The unsolicited router advertisement message 14 can include a prefix information option 16 specifying an address autoconfiguration prefix 11, and/or a prefix delegation information option 18. The router advertisement message 14 also can include a CGA parameters assignment option 70, as illustrated in FIG. 3.

In response to the prefix information option 16, the routing circuit 28 can initiate address autoconfiguration in step 142 in order to generate the CGA address as described in RFC 3972. For example, the routing circuit 28 can use in step 144 the supplied modifier 48 specified in the CGA parameters assignment option 70, if the option 70 is supplied in the router advertisement message 14; if the router advertisement message 14 does not include a CGA parameters assignment option 70, the routing circuit 28 can dynamically generate its own modifier 48 as a pseudorandom 128-bit value, in accordance with RFC 3972. The routing circuit 28 can then generate a secondary hash "Hash2" in step 146 based on performing an SHA-1 hash of the concatenated data structure of the modifier 48 obtained in step 144, followed by 9 zero octets (i.e., 72 bits), followed by the router public key 64, followed by any optional extensions 45. The symbol "|" illustrated in FIG. 5 (e.g., steps 146, 150, 152, 154) and FIG. 8 (e.g., steps 215, 222) refers to concatenating together adjacent data values. The 112 leftmost bits of the SHA-1 hash value generated in step 146 are used to form the 112-bit "Hash2" value.

The secondary hash value "Hash2" generated in step 146 is tested by the routing circuit 28 in step 148, as described in section 4 of RFC 3972, to ensure the 16*Sec leftmost bits of the "Hash2" value are all zeros (or if Sec=0). If the test fails in step 148, the routing circuit 28 increments the modifier value by one and regenerates the secondary hash value in step 146.

The routing circuit 28 next generates in step 150 the primary hash value "Hash1". In particular, the routing circuit 28 performs an SHA-1 hash of the concatenated data structure of the final modifier value concatenated with the subnet prefix 11, a collision count initially set to zero, the router public key 64, and any optional extension fields 45. The leftmost 64 bits of the SHA-1 hash performed in step 150 are used to form the 64-bit "Hash1" value. The routing circuit 28 also forms in step 150 an interface identifier from the generated primary hash value "Hash1" by writing the value of the security perimeter "Sec" into the three leftmost bits and by setting bits six and seven to zero. The interface identifier can then be used to identify the egress interface circuit 32 for communications on the attachment link 20*b*. The routing circuit 28 generates in step 152 a 128-bit CGA address based on concatenating the address autoconfiguration subnet prefix 11 with the interface identifier. For example, if in step 150 the routing circuit 28 of the router "R-01" generates the 64-bit interface identifier "0xEF37:BE79:CEBA:B1BA", the routing circuit 28 concatenates this 64-bit interface identifier after the subnet prefix "2001:0DB7::/64" 11 in step 152 to form the 128-bit CGA address "2001:0DB7::EF37:BE79:CEBA:B1BA", illustrated as "CGA1" 44 in FIGS. 2, 4, and 6.

As described earlier, the router advertisement message 14 that included the prefix information option 16 for address autoconfiguration also can include a prefix delegation information option 18, illustrated in FIG. 3. Assuming the prefix delegation information option 18 is detected by the routing circuit, the routing circuit 28 dynamically generates in step 154 a suffix 17 from a prescribed number "n" of trailing bits of the CGA address 44 generated in step 152. The prescribed number "n" of trailing bits of the CGA address 44 that are chosen to form the suffixes 17 can vary depending on implementation. For example, if "n=16" bits are selected from the 128-bit CGA address "2001:0DB7::EF37:BE79:CEBA: B1BA", the resulting suffix 17 would be "0xB1BA"; if "n=32" bits are selected, the resulting suffix 17 would be "0xCEBA:B1BA", as illustrated in FIG. 1; if "n=64" bits were selected from the CGA address "2001:0DB7::EF37: BE79:CEBA:B1 BA", the resulting 64-bit suffix 17 would be "0xEF37:BE79:CEBA:B1BA". As apparent from the foregoing, the larger the number "n" of trailing bits that are chosen from the CGA address, the greater the security in the suffix and the resulting prefix. Hence, assuming that the CGA address includes nearly all unique values (as opposed to a range of a zero-bit values), the suffix may be as long as 112 bits for optimized security.

The routing circuit 28 dynamically generates in step 154 the delegated prefix 15 (illustrated in FIGS. 1, 2, 4 and 6 as "P-01") based on concatenating the suffix 17 to the delegated prefix 13. For example, assuming a 32-bit suffix 17 of "0xCEBA:B1BA" is dynamically generated based on selecting the 32 bits from the CGA address "2001:0DB7::EF37: BE79:CEBA:B1BA" 44, the resulting concatenation with the delegated prefix "2001:0DB8::/48" in step 154 results in the autoconfigured prefix value of "2001:0DB8:0:CEBA:B1BA/ 80".

After generation of the CGA address 44 and the autoconfigured prefix 15, the routing circuit 28 generates in step 156 a neighbor solicitation message 72, illustrated in FIG. 4, to initiate duplicate address detection (DAD). Since the delegated prefix 15 is generated in step 154, the neighbor solicitation message 72 also can include the prefix claim option 78 specifying the autoconfigured prefix 15, and the appropriate parameters required according to the Secure Neighbor Discovery (SEND) protocol described in RFC 3971, including the CGA option 76 and the RSA signature option (not shown). The routing circuit 28 forwards the neighbor solicitation message 72 to the egress interface circuit 32 for output onto the attachment link (e.g., "L0") 20b for transmission to the solicited node multicast address (e.g., "FF02::1:FFBA:B1BA") 100, and waits to determine if a collision is detected in step 158 within a prescribed time interval. If collision is detected in step 158 based on reception of a solicited neighbor advertisement message that specifies either the target CGA address 44 or the autoconfigured prefix 15, the routing circuit 28 updates in step 160 its neighbor cache and 49, increments the collision count value 43, and repeats the generation of a primary hash "Hash1" in step 150.

Assuming no collisions are detected in step 158 by the routing circuit 28 within the required time interval for duplicate address detection, the routing circuit 28 checks in step 162 whether the chosen suffix 17 is less than 24 bits (i.e., n<24). For example, assume in step 154 that the routing circuit 28 chose "n=16" bits as the suffix 17; in this case, the solicited node multicast address would still have been "FF02::1:FFBA:B1BA". The routing circuit 28 creates a new multicast address in step 164 by prepending the 16-bit suffix of "0xB1BA" with "24-n" number of prescribed padding bits (e.g., all "1"s value"), resulting in the padded suffix value of "0xFF:B1BA" that is appended to the solicited node address prefix "FF02:0:0:0:0:1:FF00::/104", resulting in the multicast address "FF02::1:FFFF:B1BA". The updated multicast address with the padded suffix is used to repeat duplicate address detection in step 156 to ensure that any node that has a different CGA address, but which has the same suffix, can still defend their autoconfigured prefixes 15.

Note that duplicate address detection for the CGA address 44 and the autoconfigured prefix 15 can be performed separately using distinct neighbor solicitation messages, if preferred.

Assuming there is no collision detected by the routing circuit 28 during duplicate address detection, the routing circuit 28 can configure the egress interface circuit 32 for monitoring in step 166 the multicast addresses based on the CGA address 44, for example "FF02::1:FFBA:B1BA", as well as "FF02::1:FFFF:B1BA", as appropriate. In response to detecting any neighbor solicitation message 72 attempting to claim the CGA address 44 or the autoconfigured prefix 15 now owned by the router 12, the routing circuit 28 can output a solicited neighbor advertisement message with the CGA option and the prefix ownership option 132, illustrated in FIG. 6.

Figure 6:
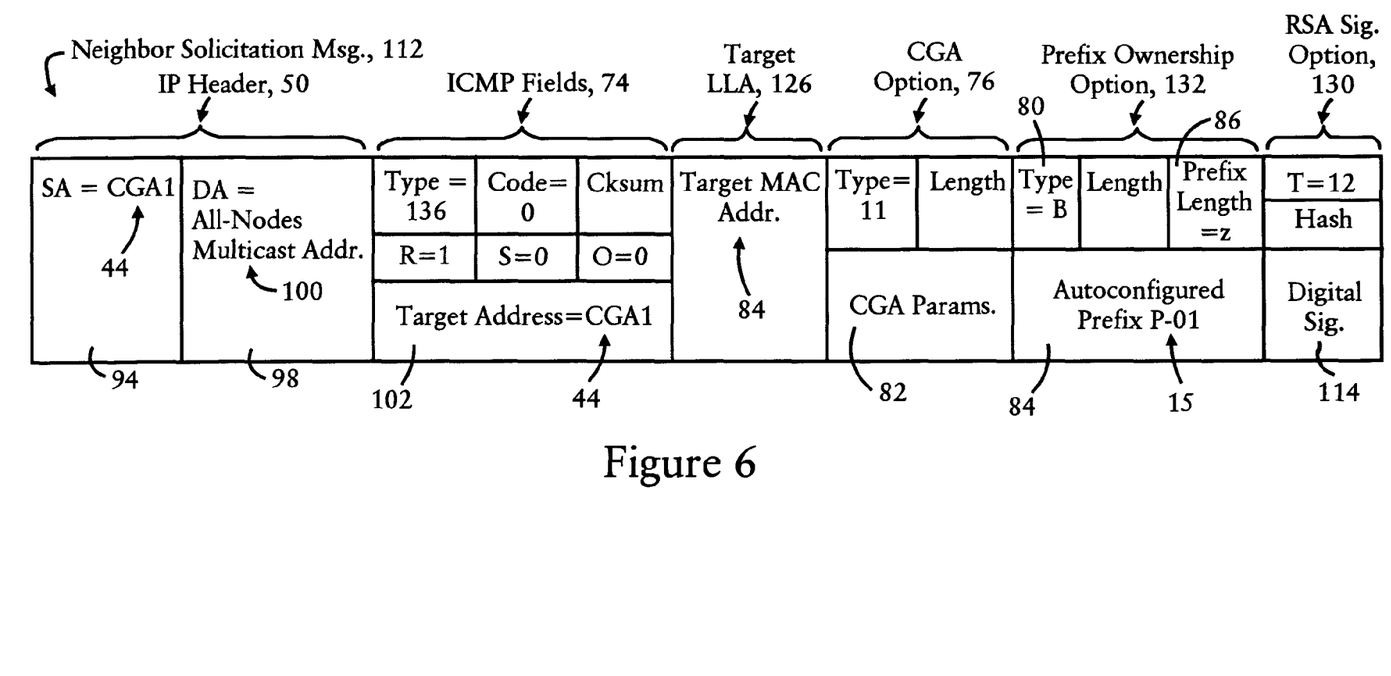
FIG. 6 illustrates an example solicited neighbor advertisement message generated by one of the routers of FIG. 1 and having an example prefix ownership option specifying an owned address prefix, according to an example embodiment.

FIG. 6 illustrates an example solicited neighbor advertisement message 112 generated by the routing circuit 28 in order to defend its CGA address 44 or its autoconfigured prefix 15, according to an example embodiment. The IP header 50 of the neighbor advertisement message 112 includes a source address field 94 that specifies the CGA Address (e.g., "CGA1") 44, and a destination address field 98 specifying the all nodes multicast address 100 as described above. The ICMP fields 74 include the required fields as specified in RFC 2461, including a target address field 102 specifying the CGA address 44. The target link layer address option 126 specifies the link layer address 84 having sent the neighbor solicitation message that initiated the neighbor advertisement message 112. The neighbor advertisement message 112 also includes the CGA option 76 including the identical parameters as illustrated in FIG. 4. The prefix ownership option 132 specifies a type field 80 having a value (e.g., "Type=B") identifying that the autoconfigured prefix 15 is owned by the router outputting the NA message 112. The routing circuit 28 can sign the neighbor advertisement message 112 by adding the RSA signature option 130 including the digital signature 114, based on performing a cryptographic hash of the preceding portions 50, 74, 126, 76, and 132 with the private key 66.

As described above, the routing circuit 28 also can renumber in step 168 the CGA address 44, and the autoconfigured prefix 15 after a prescribed time interval corresponding to the length of the suffix, in order to prevent an attacker from attempting to forge a compatible message by attempting to "break" the CGA address.

Figure 7:
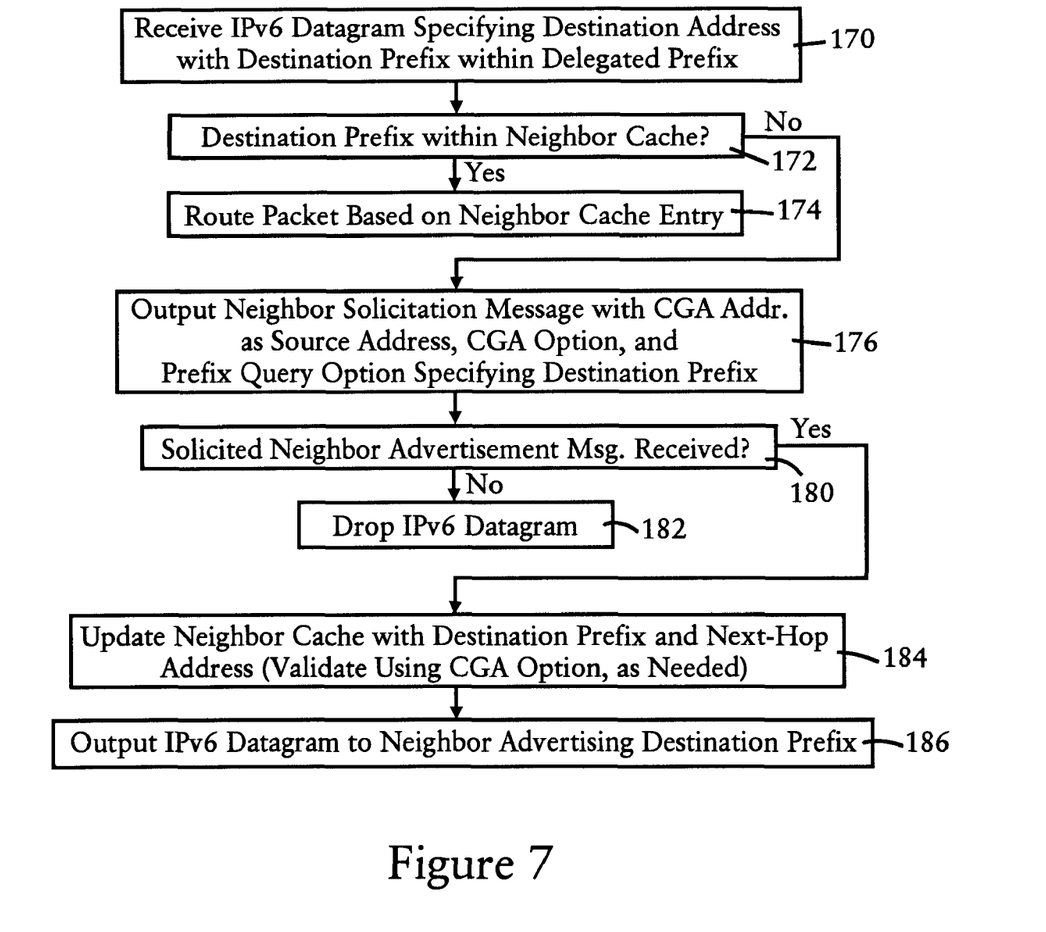
FIG. 7 illustrates an example method by one of the routers of routing an IPv6 datagram based on neighbor discovery of a destination address prefix, according to an example embodiment.

FIG. 7 illustrates an example method by the routing circuit 28 of performing prefix neighbor discovery in order to route a packet. The routing circuit 28 receives in step 170 an IPv6 datagram specifying a destination address having a destination prefix which is within the delegated prefix 13 supplied by the attachment router "R0". If in step 172 the routing circuit 28 determines that the destination prefix is within the neighbor cache 49, the routing circuit 28 routes the packet to the next hop address specified in the neighbor cache entry in step 174. If, however, there is no neighbor cache entry identifying the destination prefix, the routing circuit 28 can generate in step 176 a neighbor solicitation message similar to the NS message 72 as illustrated in FIG. 4, except that the prefix claim option 78 will be replaced with a prefix query option, which is otherwise identical to the prefix claim option 78 except that the type field 80 specifies the option as a prefix query (e.g., "Type=C"), and the prefix field 84 will specify the destination prefix. The prefix length field 86 in the NS message 72 output in step 176 will specify the same length (e.g., "z") as the required delegated prefix length 65 specified in the received router advertisement message 14 of FIG. 3. If in step 180 no solicited neighbor advertisement message is received after a prescribed interval in response to the neighbor solicitation message output in step 176, the IPv6 datagram is dropped in step 182. However, if in step 180 a solicited neighbor advertisement message is received that identifies a next hop address for reaching the destination prefix, the routing circuit 28 updates in step 184 the neighbor cache 49 with the destination prefix and next hop address specified in the solicited neighbor advertisement message (following any validation as may be required under RFC 3971). The routing circuit 28 outputs the IPv6 datagram in step 186 to the next hop neighbor that advertised the reachability of the destination prefix.

Figure 8:
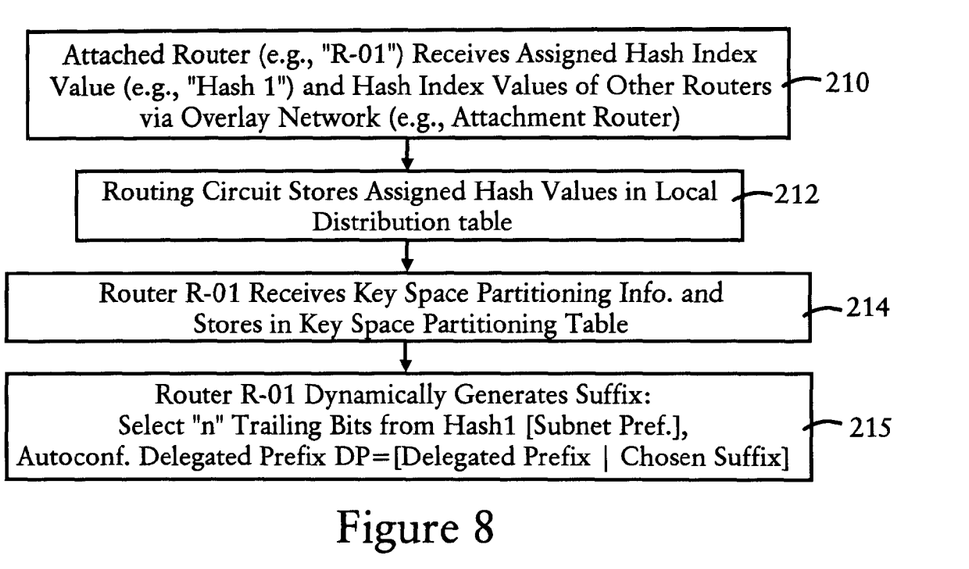
FIG. 8 illustrates an example method by an attached router that autoconfigures a delegated address prefix and routes a data packet based on a distributed hash table, according to an example embodiment.

FIG. 8 is a diagram illustrating the method by the routing circuit of autoconfiguring an address prefix, according to the example embodiment of DHT-based autoconfiguration. The method begins in step 210, where the routing circuit 28 of the attached router "R-01" receives its assigned hash value 200, plus the respective assigned hash values of the other routers, from the attachment router "R0" 12 (or some other equivalent overlay network). The routing circuit 28 stores the assigned hash values in the local distribution table 31 in step 212. The routing circuit 20 also receives and stores in step 214 the key space partitioning data from the attachment router (or some other equivalent overlay network), illustrated in the key space partitioning table 33 of FIG. 2. Hence, the key space partitioning table 33 and the local distribution table 31 enable the routing circuit 28 to forward datagrams to respective destinations based on the key space partitioning.

The routing circuit 28 can then generate in step 215 its autoconfigured delegated prefix 15 based on dynamically generating the suffix 17. In particular, the routing circuit 28 selects "n" trailing bits from hashing the address autoconfiguration prefix 11 with the corresponding assigned hash value (e.g., "Hash1") 200 to form the suffix 17. The suffix 17 is concatenated to the delegated prefix 13 to form the autoconfigured delegated address prefix (DP) 15.

Figure 9:
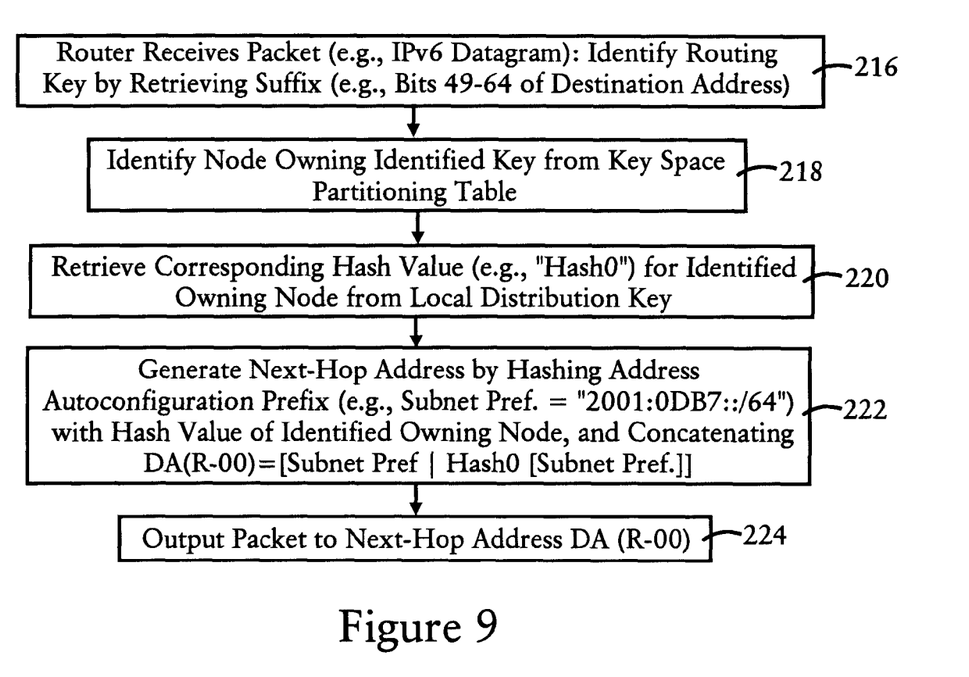
FIG. 9 is a diagram illustrating distributed hash table (DHT)-based routing of a received packet, according to an example embodiment.

The routing circuit 28 also can perform the reverse operation to identify a next hop address for a received data packet. FIG. 9 is a diagram illustrating DHT-based routing of a received packet, according to an example embodiment. In response to receiving in step 216 a packet specifying an identified key, the routing circuit 28 can identify in step 218 the node that owns the identified key by the node identifier 37. In particular, the routing circuit 28 can identify the key in step 216 based on selecting a prescribed number of "n" bits from destination address corresponding to the suffix 17 illustrated in FIG. 1. For example, the routing circuit 28 can be configured to identify the suffix 17 as the identified key based on selecting a prescribed number of bits (e.g., bits 49-64) corresponding to the range of dynamic prefix selection permitted by the attachment router "R0" for the routers.

In response to retrieving the identified key from the destination address (e.g., bits 49-64) from within the destination address in step 216, the routing circuit 28 can identify in step 218 the node that owns the identified key by the node identifier (e.g., "R-00") 37 from the key space partitioning table 33. The routing circuit retrieves in step 220 the corresponding assigned hash value (e.g., "Hash0") 200 from the local distribution table 31, and automatically generates in step 222 a destination address based on hashing the address prefix (e.g., "2001:0DB7::/64") 11 with the corresponding assigned hash value (e.g., "Hash0") 200 as specified in the local distribution table 31, and appending the address prefix 11 with the appropriate suffix (Hash0[2001:0DB7::/64]), dynamically generated based on selecting a prescribed number of bits from the hashing of the address prefix 11. Hence, the dynamically generated suffix is concatenated in step 222 with the address prefix 11 to generate the 128-the next hop address (e.g., "DA(R-00)") for routing the packet in step 224. As apparent from the foregoing, no duplicate address detection is needed for network addresses or address prefixes, because the network 10 already has been preconfigured based on the key space partitioning. Hence, in each next hop address can be dynamically generated based on the key space partitioning table 33 and the local distribution table 31.

According to the example embodiments, a network can be deployed based on automatic generation of link addresses and subnetwork address prefixes using distributed hash operations, without the necessity of routing protocols. The distributed hash values can be partitioned in advance, for example in the case of DHT-based address prefix autoconfiguration; alternately the distributed hash values can be dynamically generated and tested for collision-avoidance, as illustrated in the CGA-based address prefix autoconfiguration.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    detecting, by a router, an unsolicited first router advertisement message from an attachment router that provides an attachment link used by the router, the first router advertisement message specifying a first IPv6 address prefix owned by the attachment router and usable for address autoconfiguration on the attachment link;
    detecting, by the router, an unsolicited delegated IPv6 address prefix from the attachment router and that is available for use by the router; and
    automatically selecting by the router a second IPv6 address prefix based on concatenating a suffix to the delegated IPv6 address prefix, including dynamically generating the suffix based on a prescribed distributed hash operation executed by the router, the second IPv6 address prefix for use on at least one ingress link of the router, and outputting onto the attachment link a neighbor solicitation message having a prefix claim option, the prefix claim option specifying one of ownership or attempted ownership of the second IPv6 address prefix by the router to at least one other router on the attachment link and that is distinct from the attachment router.

2. The method of claim 1, further comprising:
    generating a cryptographically-generated address (CGA) based on applying the prescribed distributed hash operation to a pseudorandom modifier, the first IPv6 address prefix, and a public key owned by the router;
    the dynamically generating including obtaining the suffix from retrieving a prescribed number of ending bits from the cryptographically-generated address.

3. The method of claim 2, wherein the generating the cryptographically-generated address further includes generating the cryptographically-generated address based on retrieving the pseudorandom modifier from the unsolicited first router advertisement message.

4. The method of claim 2, wherein:
    the dynamically generating further includes validating the cryptographically-generated address based on outputting the neighbor solicitation message targeting the cryptographically-generated address, the neighbor solicitation message including a CGA option including a CGA parameters data structure for validation of the cryptographically-generated address, and the prefix claim option that specifies the second IPv6 address prefix, the automatically selecting including selecting the cryptographically-generated address based on a determined absence, within a prescribed interval, of any neighbor advertisement message claiming use of any one of the cryptographically-generated address or the second IPv6 address prefix.

5. The method of claim 4, wherein the neighbor solicitation message includes a destination address field specifying a first all-nodes multicast address based on the suffix, the dynamically generating further including outputting at least a second neighbor solicitation message having a second all-nodes mutlicast address based on padding the suffix with a prescribed value, based on the prescribed number of ending bits from the cryptographically-generated address in the suffix being less than a prescribed length.

6. The method of claim 2, further comprising renumbering the second IP address prefix with a second suffix based on regenerating the cryptographically-generated address after a prescribed time interval, the prescribed time interval based on a bit length of the suffix.

7. The method of claim 2, further comprising:
outputting a second neighbor solicitation message, having a prefix query option specifying a target IPv6 address prefix that is encompassed within the first IPv6 address prefix and a source address field specifying the cryptographically-generated address, in response to receiving an IPv6 datagram destined for a destination address having the target IPv6 address prefix;
receiving a solicited neighbor advertisement message having a second prefix claim option specifying the target IPv6 address prefix, and a source address field specifying a cryptographically-generated destination address, and a corresponding CGA parameters data structure; and
forwarding the IPv6 datagram to the cryptographically-generated destination address in response to validating the target IPv6 address prefix and the cryptographically-generated destination address based on corresponding CGA parameters data structure in the solicited neighbor advertisement message.

8. The method of claim 1, further comprising:
monitoring for any neighbor solicitation message having a destination address field specifying a multicast address ending with at least a portion of the suffix; and
outputting a solicited neighbor advertisement message, specifying ownership of the second IPv6 address prefix and a cryptographically-generated address generated based on the first IPv6 address prefix, in response to detecting any one of the second IPv6 address prefix or the cryptographically-generated address matching a target address or claimed prefix specified in the neighbor solicitation message, wherein the suffix is based on a prescribed number of ending bits from the cryptographically-generated address.

9. The method of claim 1, further comprising:
receiving an assigned hash index value from the attachment router according to a prescribed partitioning of a distributed hash table;
the dynamically generating the suffix further including hashing the first IPv6 address prefix with the assigned hash index value according to the prescribed distributed hash operation.

10. The method of claim 9, further comprising:
receiving a plurality of the assigned hash index values of other routers attached to the attachment link, each hash index value having a corresponding identifier; and
dynamically determining a next-hop address for routing a datagram based on locating the corresponding hash index value relative to an identifier specified in the datagram, and applying the prescribed hash operation to the first IPv6 address prefix using the corresponding hash index value.

11. An apparatus comprising:
a network interface circuit configured for connecting to an attachment link and receiving an unsolicited first router advertisement message from an attachment router that provides the attachment link, the first router advertisement message specifying a first IPv6 address prefix owned by the attachment router and usable for address autoconfiguration on the attachment link, the network interface circuit further configured for providing at least one ingress link for attached network nodes, the apparatus configured as a router; and
a routing circuit configured for detecting an unsolicited delegated IPv6 address prefix received by the network interface circuit from the attachment router and that is available for use by the routing circuit, the routing circuit configured for automatically selecting a second IPv6 address prefix for use on the at least one ingress link based on concatenating a suffix to the delegated IPv6 address prefix, the routing circuit configured for dynamically generating the suffix based on a prescribed distributed hash operation, wherein the routing circuit is configured for generating, for output by the network interface circuit onto the attachment link, a neighbor solicitation message having a prefix claim option, the prefix claim option specifying one of ownership or attempted ownership of the second IPv6 address prefix by the router to at least one other router on the attachment link and that is distinct from the attachment router;
where any one of the network interface circuit or the routing circuit is implemented in one or more integrated circuits.

12. The apparatus of claim 11, wherein the routing circuit is configured for generating a cryptographically-generated address (CGA) based on applying the distributed hash operation to a pseudorandom modifier, the first IPv6 address prefix, and a public key owned by the router;
the dynamically generating including obtaining the suffix from retrieving a prescribed number of ending bits from the cryptographically-generated address.

13. The apparatus of claim 12, wherein the routing circuit is configured for generating the cryptographically-generated address based on retrieving the pseudorandom modifier from the unsolicited first router advertisement message.

14. The apparatus of claim 12, wherein:
the routing circuit is configured for validating the cryptographically-generated address based on generating the neighbor solicitation message targeting the cryptographically-generated address, the neighbor solicitation message including a CGA option including a CGA parameters data structure for validation of the cryptographically-generated address, and the prefix claim option that specifies the second IPv6 address prefix;

the routing circuit configured for selecting the cryptographically-generated address based on a determined absence, within a prescribed interval, of any neighbor advertisement message claiming use of any one of the cryptographically-generated address or the second IPv6 address prefix.

15. The apparatus of claim 14, wherein the neighbor solicitation message includes a destination address field specifying a first all-nodes multicast address based on the suffix, the routing circuit configured for generating at least a second neighbor solicitation message having a second all-nodes of the cast address based on padding the suffix with a prescribed value, based on the prescribed number of ending bits from the cryptographically-generated address in the suffix being less than a prescribed length.

16. The apparatus of claim 12, wherein the routing circuit is configured for renumbering the second IPv6 address prefix with a second suffix based on regenerating the cryptographically-generated address after a prescribed time and of all, the prescribed time interval based on a bit length of the suffix.

17. The apparatus of claim 12, wherein:
the routing circuit is configured for generating a second neighbor solicitation message, having a prefix query option specifying a target IPv6 address prefix that is encompassed within the first IPv6 address prefix and a source address field specifying the cryptographically-generated address, in response to the network interface circuit having received an IPv6 datagram destined for a destination address having the target IPv6 address prefix;
the network interface circuit is configured for receiving a solicited neighbor advertisement message having a second prefix claim option specifying the target IPv6 address prefix, and a source address field specifying a cryptographically-generated destination address, and a corresponding CGA parameters data structure;
the routing circuit further configured for forwarding the IPv6 datagram to the cryptographically-generated destination address in response to validating the target IPv6 address prefix and the cryptographically-generated destination address based on corresponding CGA parameters data structure in the solicited neighbor advertisement message.

18. The apparatus of claim 11, wherein:
the network interface circuit is configured for monitoring for any neighbor solicitation message having a destination address field specifying a multicast address ending with at least a portion of the suffix;
the routing circuit configured for generating a solicited neighbor advertisement message, specifying ownership of the second IPv6 address prefix and a cryptographically-generated address generated by the routing circuit based on the first IPv6 address prefix, in response to detecting any one of the second IPv6 address prefix or the cryptographically-generated address matching a target address or claimed prefix specified in the neighbor solicitation message, wherein the suffix generated by the routing circuit is based on a prescribed number of ending bits from the cryptographically-generated address.

19. The apparatus of claim 11, wherein the routing circuit is configured for obtaining an assigned hash index value from the attachment router according to a prescribed partitioning of a distributed hash table, the routing circuit further configured for dynamically generating the suffix based on hashing the first IPv6 address prefix with the assigned hash index value according to the prescribed distributed hash operation.

20. The apparatus of claim 19, wherein:
the routing circuit is configured for receiving a plurality of the assigned hash index values of other routers attached to the attachment link, each hash index value having a corresponding identifier;
the routing circuit configured for dynamically determining a next-hop address for routing a datagram based on locating the corresponding hash index value relative to an identifier specified in the datagram, and applying the prescribed hash operation to the first IPv6 address prefix using the corresponding hash index value.

21. An apparatus comprising:
means for connecting to an attachment link and receiving an unsolicited first router advertisement message from an attachment router that provides the attachment link, the first router advertisement message specifying a first IPv6 address prefix owned by the attachment router and usable for address autoconfiguration on the attachment link, the means for connecting further configured for providing at least one ingress link for attached network nodes, the apparatus configured as a router; and
means for detecting an unsolicited delegated IPv6 address prefix received by the means for connecting from the attachment router and that is available for use by the means for detecting, the means for detecting configured for automatically selecting a second IPv6 address prefix for use on the at least one ingress link based on concatenating a suffix to the delegated IPv6 address prefix, the means for detecting configured for dynamically generating the suffix based on a prescribed distributed hash operation, wherein the means for detecting is configured for generating, for output by the means for connecting onto the attachment link, a neighbor solicitation message having a prefix claim option, the prefix claim option specifying one of ownership or attempted ownership of the second IPv6 address prefix by the apparatus to at least one other router on the attachment link and that is distinct from the attachment router.

* * * * *